United States Patent
Kirsteins et al.

(10) Patent No.: US 6,356,600 B1
(45) Date of Patent: Mar. 12, 2002

(54) NON-PARAMETRIC ADAPTIVE POWER LAW DETECTOR

(75) Inventors: Ivars P. Kirsteins, Cranston, RI (US); Sanjay K. Mehta, Norwich; John W. Fay, Groton, both of CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/063,800

(22) Filed: Apr. 21, 1998

(51) Int. Cl.$^7$ .............................................. H03D 1/00
(52) U.S. Cl. ...................................... 375/340; 708/520
(58) Field of Search ................................ 375/340, 343, 375/346, 348, 345, 278, 285, 350; 364/724.19, 737; 708/520, 530; 455/67.3, 278.1, 267, 283, 296

(56) References Cited

U.S. PATENT DOCUMENTS

| | | | |
|---|---|---|---|
| 5,640,429 A | * 6/1997 | Michels et al. | 375/340 |
| 5,754,974 A | * 5/1998 | Griffin et al. | 704/206 |
| 5,774,837 A | * 6/1998 | Yeldener et al. | 704/208 |
| 5,794,194 A | * 8/1998 | Takebayashi et al. | 704/251 |
| 5,870,405 A | * 2/1999 | Hardwick et al. | 714/701 |
| 5,890,108 A | * 3/1999 | Yeldener | 704/208 |
| 5,969,777 A | * 10/1999 | Mawatari | 348/845 |

* cited by examiner

Primary Examiner—Chi H. Pham
Assistant Examiner—Emmanuel Bayard
(74) Attorney, Agent, or Firm—Michael J. McGowan; Prithvi C. Lall; Michael F. Oglo

(57) ABSTRACT

A system for detecting unknown broadband signals in noise consisting of non-stationary narrowband components and a stationary colored broadband component includes a sensor which collects data in which a signal of interest may be found and generates a received data stream. A preprocessor operates on the received data stream to generate training and detection vectors corresponding to noise only and noise plus signal intervals of the received data stream, respectively. A spectrum processor receives the training and detection vectors and generates cleaned broadband spectrum estimates $\tilde{C}_1(f)$ and $\tilde{C}_2(f)$ from the training and detection vectors, respectively, by adaptively separating non-stationary tonal components from the stationary broadband component using modified multiple taper spectral estimation combined with maximum likelihood tonal removal. The cleaned broadband spectrum estimates $\tilde{C}_1(f)$ and $\tilde{C}_2(f)$ are passed to a detection processor which detects unknown broadband signals within the received data stream using a power law detection process which operates on normalized (whitened) broadband signals $\tilde{C}_2(f)/\tilde{C}_1(f)$ to identify the number and location of the DFT bins occupied by a detected signal, if present.

14 Claims, 2 Drawing Sheets

NON-PARAMETRIC ADAPTIVE POWER LAW DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a system and method for detecting signals in noise. More specifically, the present invention relates to the detection of unknown broadband signals in noise consisting of non-stationary narrowband components and a stationary colored broadband component.

(2) Description of the Prior Art

Many applications require the identification of a desired signal within undesired random signals (noise) which is received with and often interferes with the desired signal. For example, in sonar systems randomly generated sounds from both natural and man made sources give rise to a noise that interferes with desired acoustic signals. To detect and identify a specific contact, such as an underwater vehicle, requires a system which can detect a signal corresponding to a contact within received data containing both the signal and undesired signals (noise). Similarly, in communications systems control signals must be differentiated from the data signals which are carried on the same channels.

Received data is modeled as the sum of a signal component and a noise component. When information about the signal and/or noise components is known or can be accurately presumed, several methods are often available to choose from in constructing a robust signal detector. For example, if the probability density function and spectrum of the signal and noise components are known, it is possible to construct an optimum detector using either Neyman-Pearson or uniformly most powerful invariant detection methods. With sufficient signal information known, detecting and extracting desired signals in noise is a relatively straightforward exercise.

However, in many applications nothing is known about either the signal or the noise components present. In applications where nothing is known about the signal or noise components, a commonly used receiver is an energy detector given by:

$$\sum_{k=1}^{N} |X_k|^2 \overset{\text{signal present}}{\underset{\text{signal absent}}{\gtrless}} \lambda \qquad (1)$$

where $X_k$ is the $k^{th}$ data DFT bin $$X_k = \int_T \backslash(\backslash\%\backslash)x(t)e^{-i2\pi\frac{(k-1)}{T}}dt, \qquad (2)$$

x(t)=s(t)+n(t) is the received data and $\lambda$ is a threshold. The energy detector performs well and is quite suited for many applications. Additionally, the energy detector is non-parametric, requiring almost no prior knowledge about the signal. However, the energy detector, which is optimum when the signal occupies the entire Nyquist bandwidth, performs poorly when the signal has small bandwidth relative to the Nyquist rate. The energy detector also performs poorly when the noise component contains colored noise.

Recently, use of power law detectors for detection of unknown signals has been proposed. A power law detector for detecting a Gaussian signal in Gaussian noise is given by:

$$\sum_{k=1}^{N} (|X_k|^2)^\nu \overset{\text{signal present}}{\underset{\text{signal absent}}{\gtrless}} \lambda \qquad (3)$$

where the power $\nu$ is a positive real number. If a signal is present, the signal will occupy an arbitrary set of M out of a total of N DFT bins. With the power $\nu$ appropriately chosen, the power law detector significantly outperforms energy detectors (equation (1)) when the normalized-signal bandwidth is small (i.e., M/N<<1). However, when signal bandwidth is large, the power law detector is slightly out performed by the energy detector. As can be seen when the power $\nu$ is one, the power law detector is identical to the energy detector.

Although the power law detector provides improved performance, as compared to that of the energy detector, it suffers from several disadvantages which limits its use for many applications. For example, the power law adapter assumes the noise component n(t) is white which is not true for most applications. Additionally, the power law detector is inherently sensitive to interfering tonals. Furthermore, prewhitening, using conventional periodogram-based or inversecovariance techniques is not practical for several reasons.

For instance, in many applications, the tonal components tend to be highly non-stationary due to channel variability and source and receiver motion which makes tonal amplitude or power difficult to estimate. Over resolution of the spectral microstructure, which is inherently unstable due to non-stationarity, and frequency drifting due to source and receiver motion results in inaccurate estimates of the spectrum. Additionally, periodogram-based methods using smoothers work poorly in the presence of closely spaced tones and high sidelobe leakage. Unpredictable smearing, biases, and leakage effects due to windowing are also inherent in periodogram-based methods.

Thus, what is needed is a signal detector capable of detecting unknown signals over a range of bandwidths within received data having both white and colored noise components.

SUMMARY OF THE INVENTION

Accordingly, it is a general purpose and object of the present invention to provide system and method for detecting unknown signals in noise which does not require knowledge of either the signal to be detected or the noise present.

Another object of the present invention is to provide a system capable of detecting unknown signals over a wide range of bandwidths when the received data contains both white and colored noise.

A further object of the present invention is the provision of system and method for detecting unknown broadband signals in noise consisting of non-stationary narrowband components and a stationary colored broadband component.

These and other objects made apparent hereinafter are accomplished with the present invention by a system which uses a non-parametric adaptive power law detector operating on a normalized (whitened) broadband signals to detect unknown broadband signals in noise. A sensor collects data in which a signal of interest may be found and generates a received data stream. A preprocessor operates on the received data stream to generate data vectors $x_T$ and $x_D$ corresponding to training (noise only) and detection (noise plus signal) intervals of the received data stream, respectively. A spectrum processor receives the training and detection vectors and generates cleaned broadband spectrum estimates $\tilde{C}_1(f)$ and $\tilde{C}_2(f)$ of the $x_T$ and $x_D$ vectors, respectively, by adaptively separating non-stationary tonal components from the stationary broadband component using modified multiple taper spectral estimation combined with maximum likelihood tonal removal. The cleaned broadband spectrum estimates $\tilde{C}_1(f)$ and $\tilde{C}_2(f)$ are passed to a detection processor which uses the spectrum estimates as input to a non-parametric power law detection process given by the test statistic:

$$\sum_n \left(\frac{\tilde{C}_2(f_n)}{\tilde{C}_1(f_n)}\right)^v \begin{array}{c} \text{signal present} \\ > \\ \leq \\ \text{signal absent} \end{array} \lambda \quad (4)$$

When a signal is present, the detection processor produces an output signal which indicates the number and location of the n DFT bins occupied by the signal.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
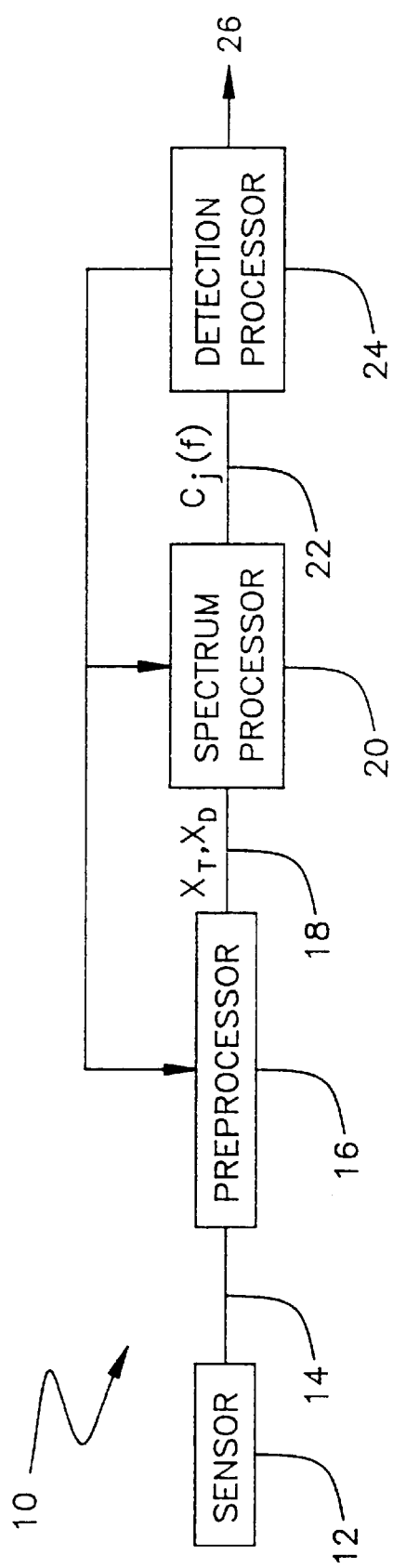
FIG. 1 is a block a diagram of an embodiment of a system for detecting broadband signals in noise that does not require knowledge of either the broadband signal or the noise present.

The present invention provides a system and method for detecting broadband signals in noise that do not require knowledge of the signal to be detected or of the noise present. Referring to FIG. 1, there is shown a system 10 for detecting broadband signals in noise in accordance with the present invention. System 10 includes sensor 12 which collects data of interest from the surrounding environment and generates received data stream 14. Preferably received data stream 14 generated by sensor 12 comprises a series of digital values.

Received data stream 14 is modeled as:

$x(t)=n(t)$ (noise only)

$x(t)=s(t)+n(t)$ (signal plus noise) (5)

under the signal absent and signal present hypotheses, respectively. Nothing is known or assumed about either the signal s(t) or noise n(t) components of data stream 14 except that the noise component n(t) is assumed to comprise non-stationary narrowband components and a stationary colored broadband component. Preprocessor 16 compiles training $x_T$ and detection $x_D$ vectors (collectively data vectors 18) from data stream 14. The training vector $x_T=[x_n, x_{n+1}, \ldots, x_{n+P-1}]^T$ corresponds to a signal-free (noise only) interval of received data stream 14. The detection vector $x_D=[x_{n+S}, x_{n+S+1}, \ldots, x_{n+S+P-1}]^T$ corresponds to a detection interval (signal plus noise) of received data 14.

Spectrum processor 20 generates cleaned broadband spectrum estimates $\tilde{C}_1(f)$ and $\tilde{C}_2(f)$ (spectrum estimates 22) from data vectors 18 by adaptively separating non-stationary tonal components from the stationary broadband component. Processor 20 uses a modified multiple taper spectral estimation combined with maximum likelihood tonal removal to estimate and remove tonals from an underlying broadband spectrum component to yield the broadband spectrum estimates $\tilde{C}_1(f)$ and $\tilde{C}_2(f)$ for the training and detection intervals, respectively.

As is known to those skilled in the art, a multiple taper spectral estimate is given by:

$$\tilde{X}(f) = \frac{1}{K}\|V^H D(f) x\|_F^2 \quad (6)$$

wherein $V^H$ is an N×K matrix whose columns are the principal Discrete Prolate Spheroidal Sequence's (DPSS's) $v_n^k(N,W)$, which are the eigenvectors of the N×N matrix $$[R]_{m,n} = \frac{\sin 2\pi W(n-m)}{\pi(n-m)}, \quad (7)$$

arranged to correspond to the eigenvalues in descending order, $x=[x_0, x_1, \ldots, x_{N-1}]^T$, $D(f)=\text{diag}(1, e^{-i2\pi f}, \ldots, e^{-i(N-1)2\pi f})$, and $K \approx 2NW$. The width of the subbands W is chosen to be sufficiently small so that the true spectrum is approximately flat in the interval $[f_0-W, f_0+W]$, but large enough to keep the degrees of freedom $K=2NW$ of $\tilde{X}(f)$ as large as possible.

Recalling that $V^H$ in equation (6) acts as an lowpass filter in the band $[-W, W]$, it is readily seen that the projection of the frequency downshifted data vector $D(f)x$ onto $V^H$ becomes a bandpass filtering of the data to $[f-W, f+W]$. The spectral estimate $\tilde{X}(f)$, therefore, approximates the average energy in the band $[f-W, f+W]$. Additionally, for a given set of frequency points $f_1, \ldots, f_M$, the spectrum estimate provided by equation (6) is analogous to filtering, x into the subbands $\{[f_0-W, f_0+W], [f_1-W], \ldots, [f_M-W, f_M+W]\}$ and calculating the average energy in each band.

As can be seen from the preceding discussion, multiple taper estimation provides a simple and effective way of locating tonals for removal from the underlying broadband spectrum background component. To mitigate the effects of background spectrum variations and adjacent tonals, the estimation and removal of tonals is done within each subband. The projection of $D(f)x$ onto $V^H$ effectively isolates the frequency band $[f-W, f+W]$ from out of band tonals, and if W is properly chosen, the background noise spectrum is approximately locally flat or white. Thus, effects from out of band tonals and variations in the background spectrum are minimized.

A simple least-squares fitting procedure has been proposed to estimate and remove the tonals. However, the least-squares fitting procedure assumes that only one tonal is present in the interval $[f-W, f+W]$. This single tonal assumption is a major restriction because, in most applications, the data often has several tonals within each subband. An additional difficulty with the data encountered in many applications is that the tonals are generally non-stationary.

To deal with the shortcomings of the existing methods for locating and removing tonals described above, spectrum processor 20 uses a modified multiple taper spectral estimation combined with maximum likelihood tonal removal. Processor 20 addresses the non-stationarity of the data by partitioning the training vector $x_T$ and detection vector $x_D$, each having a length P, into L contiguous smaller subblocks, $x_T=[x_{1,1}, x_{1,2}, \ldots, x_{1,L}]$ and $x_D=[x_{1,1}, x_{1,2}, \ldots, x_{1,L}]$, such that the narrowband components are locally stationary within each subblock $x_{j,k}$. Processor 20 then estimates the multiple tonals in each subband by solving:

$$\min_{\alpha^f_{j,k,l},\omega^f_{j,k,l}} \left\| V^H D(f) x_{j,k} - \sum_{l=1}^{M^f_k} \alpha^f_{j,k,l} V^H e(\omega^f_{j,k,l}) \right\|^2_F \quad (8)$$

$$\text{for } j = 1, 2; k = 1, 2, \ldots, L; l = 1, 2, \ldots, M^f_k$$

wherein the vector $x_{j,k}$ corresponds to the $k^{th}$ data subblock from either the training (j=1) or detection (j=2) vectors, $M^k_f$ is the number of tonals in frequency subband $f$ for subblock k, and $\hat{\alpha}^f_{j,k,l}$ and $\hat{\omega}^f_{j,k,l}$ are estimates of the amplitude and frequency, respectively, of the narrowband tonals in subband frequency $f$ and subblock k. Note that $e(\omega)=[1, e^{i\omega}, e^{i2\omega}, \ldots, e^{i(N-1)\omega}]^T$ and that the frequency search is restricted to the interval $[-W, +W]$.

Having identified the narrowband tonals, processor 20 removes the tonals, yielding the estimate of the continuous part of the spectrum at frequency $f$:

$$\tilde{C}_j(f) = \frac{1}{L} \sum_{k=1}^{L} \frac{1}{K - M^f_k} \left\| V^H D(f) x_{j,k} - \sum_{l=1}^{M^f_k} \hat{\alpha}^f_{j,k,l} V^H e(\hat{\omega}^f_{j,k,l}) \right\|^2_F \quad (9)$$

where $\hat{\alpha}^f_{j,k,l}$ and $\hat{\omega}^f_{j,k,l}$ are solutions to equation (8). Spectrum processor 20 passes the broadband spectrum estimates $\tilde{C}_1(f)$ and $\tilde{C}_2(f)$ to detection processor 24.

Detection processor 24 uses the broadband spectrum estimates $\tilde{C}_1(f)$ and $\tilde{C}_2(f)$ (spectrum estimates 22) as input to a non-parametric power law detection process. The power law detection process uses a test statistic given by:

$$\sum_n \left( \frac{\tilde{C}_2(f_n)}{\tilde{C}_1(f_n)} \right)^\nu \begin{array}{c} \text{signal present} \\ > \\ \leq \\ \text{signal absent} \end{array} \lambda \quad (10)$$

wherein $\tilde{C}_1(f_n)$ is an estimate of the broadband noise spectrum from a signal-free training vector $x_T$ for the $n^{th}$ subband, $\tilde{C}_2(f_n)$ is an estimate of the broadband signal and noise spectrum generated from a detection vector $x_D$ for the $n^{th}$ subband, and the power $\nu$ is a positive real number. When a signal is present, the detection processor 24 produces an output signal 26 which indicates the number and location of the n DFT bins occupied by the detected signal. Additionally, processor 24 provides feedback to preprocessor 16 and spectrum processor 20 allowing adjustment of processing parameters such as the size (length P) of the data vectors 18, the width W of the subbands, and/or the size or number L of the subblocks $x_{j,k}$.

Figure 2:
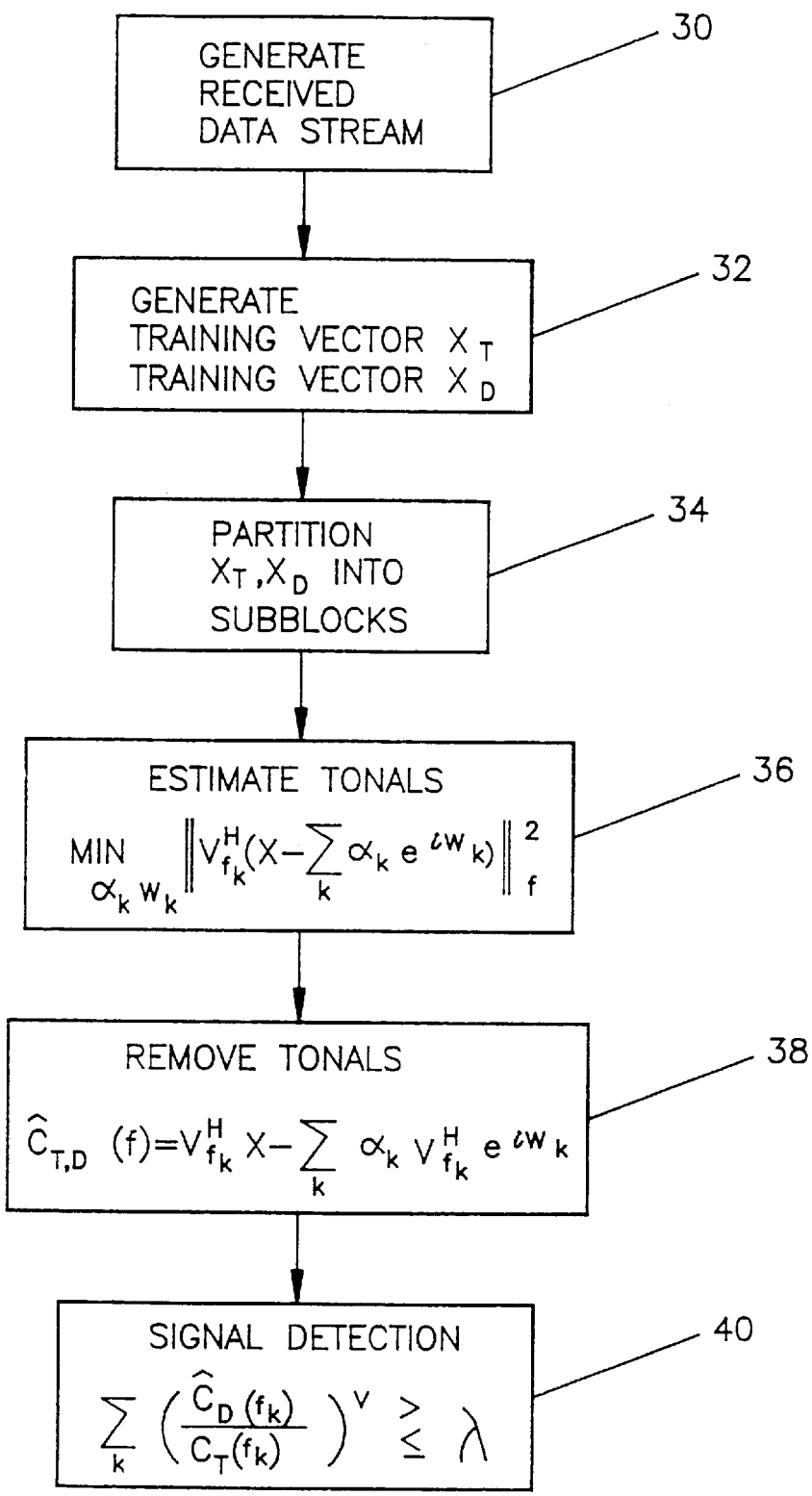
FIG. 2 is a block a diagram showing a process for detecting broadband signals in noise.

The operation of detection system 10 of FIG. 1, will be discussed with additional reference to FIG. 2 illustrating the broadband signal detection process of the present invention. In step 30, which corresponds to the functions of sensor 12, received data stream 14 is generated from data of interest gathered from the surrounding environment. The data is gathered by sensor 12 which is designed to collect data in which a signal of interest may be found. The type of sensor used as well as the data collected is dependent upon the application. For example, in a sonar application sensor 12 may comprise a single transducer or an array (linear, planer, spherical) of acoustic transducers. Similarly, for radio astronomy, sensor 12 may comprise a single antenna or an array thereof. In addition to gathering data, sensor 12 may preprocess the data. For example, sensor 12 may beamform and/or matched-filter the received data before the data is passed to preprocessor 16.

In step 32, corresponding to the function of preprocessor 16, the training $x_T$ and detection $x_D$ vectors are compiled from the received data 14. If a period exits in which it is known that no signal is present in the received data stream 14, preprocessor 16 can capture and store the received data for later use as a reference noise only sample from which the training vectors will be assembled. In such situations, preprocessor 16 compiles the detection vectors from the received data stream 14 and the training vectors from the stored reference noise only data sample.

In most applications a noise only reference is not available and/or the noise characteristics are changing, thus storing a sample noise only reference is not practical. In such applications, preprocessor 16 uses a pair of sliding windows to capture the portions of received data stream 14 from which the training $x_T$ and detection $x_D$ vectors are compiled. The use of two sliding windows to capture and compile data vectors 18 is illustrated in FIG. 3.

Figure 3:
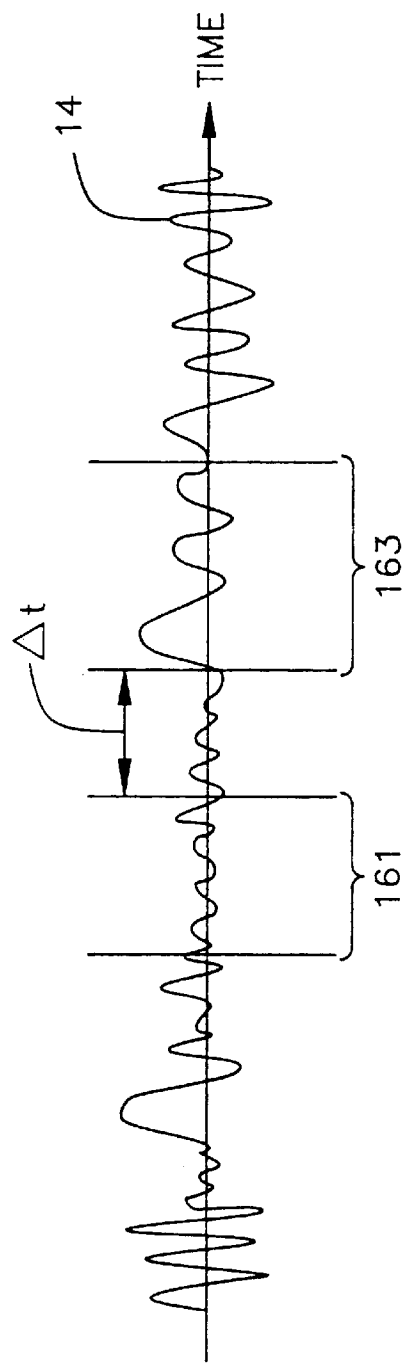
FIG. 3 illustrates the use of a pair of sliding windows to acquire training and detection data.

In FIG. 3, training window 161 and detection window 163 are used to capture data. The portion of data stream 14 within training window 161 comprises the training vector $x_T$ while the portion of data stream within the detection window 163 comprises the detection vector $x_D$. As windows 161 and 163 slide across the received data stream, preprocessor 16 periodically captures the data within the windows and compiles the training and detection vectors using the data within the two windows. Preprocessor 16 should capture the data within windows 161 and 163 at an interval equal to the size of the windows, in seconds, to ensure that the entire received data stream 14 is sampled.

By way of example, assume that the two sliding windows 161 and 163 are adjacent (Δt=0) and that the data is sampled at intervals equal to the width of the windows 161 and 163. With this arrangement, for each new detection window 163 captured, the data captured by training window 161 comprises the data from the previous detection window 163. This sampling process continues until a signal is detected by processor 24. Once a signal is detected, preprocessor 16 no longer captures the data in training window 161 and the most recent training vector is saved as a reference noise only training vector—as data stream 14 no longer represents noise only, but signal and noise. When detection processor 24 indicates that no signal is present in the detection vector, preprocessor 16 begins to once again capture data within training window 161 for compilation of new training vectors.

Referring again to FIGS. 1 and 2, the training $x_T$ and detection $x_D$ vectors are passed to spectrum processor 20 where each of the vectors are partitioned into sets of L smaller contiguous subblocks such that the narrowband components are considered locally stationary in each subblock (step 34). The size of each subblock $x_{j,k}$ is determined based on reference noise samples or estimates of the noise spectrum present. The estimates can be continually revised and the size of the subblocks adjusted based on the actual noise received by system 10 during operation. For detecting broadband signals using acoustic data collected in the ocean wherein the noise is characterized by interfering narrowband components from man made sources (e.g., shipping) as well as from natural sources, a subband width W of 0.55 Hz and detection vectors of 4.5 seconds partitioned into L=10 subblocks of 0.45 seconds each has provided good results.

After partitioning the training $x_T$ and detection $x_D$ vectors, processor 20 estimates the broadband part of the spectrum $\tilde{C}_1(f)$ and $\tilde{C}_2(f)$ for the training and detection intervals. In step 36, narrowband tonals in each frequency subband $f$ are estimated by solving equation (8). In estimating and removing the narrowband tonals the number of frequency subbands $f$, as well as the width W of the subbands, is generally based upon the characteristics of the broadband noise and the spectral structure of the signal to be detected. If the signal detected is broadband and the noise is slowly varying as a function of frequency, then fewer (and wider) subbands can be used. However, if the noise is varying, then more, and thus narrower, subbands providing finer resolution should be used.

Several techniques are available for solving equation (8) to estimate the narrowband tonals present within the subband. The estimates can be obtained using any known algorithm for maximum likelihood optimization, including, but not limited to, stabilized Newton, quasi-Newton or gradient based algorithms. A preferred technique for solving equation (8) reduces the multidimensional search of the maximum likelihood estimation into a series of one-dimensional searches along the surface of the compressed likelihood function. This method is described in Tufts, Hongya, and Umesh, *Fast Maximum Likelihood Estimation of Signal Parameters using the Shape of the Compressed Likelihood Function*, IEEE J. Oceanic Eng., vol. 18, no. 4, pp 388–400, incorporated herein by reference, and in S. Umesh, *Fast Maximum Likelihood Estimation of Parameters in Crowded Signal Environments*, Ph.D. dissertation, Univ. of Rhode Island, August 1993, (reprinted in Vol. 55/03-B of Dissertation Abstracts International, p. 1105).

After estimating the narrowband tonals in each subband frequency $f$ and subblock k, the processor 20 removes the tonals to yield the broadband spectrum estimate using equation (9) (step 38). As can be seen, equation (9) modifies the multiple taper spectral estimation (equation (6)) by combining the multiple taper estimation with maximum likelihood tonal removal.

In step 40, which corresponds to the functions of detection processor 24, signals are detected using a power law detection process which operates on normalized (whitened) broadband signals $\tilde{C}_2(f)\tilde{C}_1(f)$. Processor 24 uses the test statistic given by equation (10) to identify unknown signals in noise. The power law detection process given in equation (10) identifies the number and location of the DFT bins occupied by a detected signal, if present. The power $v$ is determined empirically. Studies have shown that the best value for $v$ varies with the number of signal occupied bins. If every bin is occupied a power $v=1$ is optimal, and as fewer bins are occupied a larger power becomes optimal. When the number of occupied bins is completely unknown, a power $v=2.5$ appears to be the best compromise value; however, values in a the range of 2–3 have provided good results. A general discussion of the performance of power law detectors can be found in Nuttall, *Detection Performance of Power-Law Processors for Random Signals of Unknown Location, Structure, Extent, and Strength*, NUWC-NPT Technical Report 10,751.

The system 10 described herein may be implemented in hardware using standard electronic components to form the circuits for performing the functions in the various functional blocks. Similarly, each processor can comprise a programmable digital signal processor circuit. The system may also be implemented using a computer and software which carries out the aforementioned functions. The software may be in any desired language and may use standard mathematical techniques to perform the functions described herein. A software implementation is preferred due to greater degree of flexibility in reconfiguration for various types of received data.

Thus, what has been described is a novel system and method for detecting unknown broadband signals in the presence of noise that offers several significant advantages over prior art systems. The detection system is nonparametric and adaptive, requiring no knowledge of the signal to be detected or the noise present. Additionally, the present invention is highly robust against interfering, non-stationary narrowband noise components.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for detecting unknown broadband signals in a received data stream comprising:

a preprocessor operating the received data stream to generate a training vector $x_T$ corresponding to a noise only portion of the received data stream and a detection vector $x_D$ corresponding to noise plus signal interval of the received data stream;

a spectrum processor coupled to receive said training and detection vectors from said preprocessor, said spectrum processor generating cleaned broadband spectrum estimates $\tilde{C}_1(f)$ and $\tilde{C}_2(f)$ of said training and detection vectors; and a detection processor coupled to receive said cleaned broadband spectrum estimates $\tilde{C}_1(f)$ and $\tilde{C}_2(f)$, said detection processor using the spectrum estimates as input to a non-parametric power law detection process given by:

$$\sum_n \left(\frac{\tilde{C}_2(f_n)}{\tilde{C}_1(f_n)}\right)^v \begin{array}{c} \text{signal present} \\ > \\ \leq \\ \text{signal absent} \end{array} \lambda$$

wherein $\tilde{C}_1(f_n)$ is a broadband spectrum estimate of the training vector $x_T$ for the $n^{th}$ subband, $\tilde{C}_2(f_n)$ is a broadband spectrum estimate of the detection vector $x_D$ for the $n^{th}$ subband, and $v$ is a positive real number to provide an output indicating a number and location of subbands occupied by a detected signal.

2. The system of claim 1 wherein said spectrum processor generates said cleaned broadband spectrum estimates $\tilde{C}_1(f)$ and $\tilde{C}_2(f)$ by adaptively separating non-stationary tonal components from the stationary broadband component.

3. The system of claim 2 wherein said spectrum processor partitions the training vector $x_T$ and detection vector $x_D$ into L contiguous smaller subblocks, said partitioned training vector being given by $x_T=[x_{1,1}, x_{1,2}, \ldots, x_{1,L}]$ and said partitioned detection vector being given by $x_D=[x_{1,1}, x_{1,2}, \ldots, x_{1,L}]$, and estimates said non-stationary tonal components by solving:

$$\min_{\alpha_{j,k,l}^f, \omega_{j,k,l}^f} \left\| V^H D(f) x_{j,k} - \sum_{l=1}^{M_k^f} \alpha_{j,k,l}^f V^H e(\omega_{j,k,l}^f) \right\|_F^2$$

for $j = 1, 2; k = 1, 2, \ldots, L; l = 1, 2, \ldots, M_k^f$ wherein the vector $x_{j,k}$ is the $k^{th}$ data subblock from the partitioned training and detection vectors, $M_k^f$ is the number of tonals in frequency subband $f$ for subblock k, and $\hat{\alpha}_{j,k,l}^f$ and $\hat{\omega}_{j,k,l}^f$ are estimates of the amplitude and frequency, respectively, of the narrowband tonals in subband frequency $f$ and subblock k.

4. The system of claim 3 wherein said spectrum processor removes narrowband tonals using modified multiple taper spectral estimation given by:

$$\tilde{C}_j(f) = \frac{1}{L} \sum_{k=1}^{L} \frac{1}{K - M_k^f} \left\| V^H D(f) x_{j,k} - \sum_{l=1}^{M_k^f} \hat{\alpha}_{j,k,l}^f V^H e(\hat{\omega}_{j,k,l}^f) \right\|_F^2$$

to generate said cleaned broadband spectrum estimates $\tilde{C}_1(f)$ and $\tilde{C}_2(f)$.

5. The system of claim 4 further including a sensor for generating said received data stream in response to a received signal.

6. The system of claim 5 wherein said sensor comprises an acoustic transducer.

7. The system of claim 2 wherein said spectrum processor estimates and removes narrowband tonals from an underlying broadband spectrum using multiple taper spectral estimation combined with maximum likelihood estimation.

8. A method for detecting unknown broadband signals in noise comprising the steps of:

generating a received data stream of digital values in response to a received signal;

generating a training vector $x_T$ corresponding to a noise only portion of said received data stream and a detection vector $x_D$ corresponding to noise plus signal portion of said received data stream;

generating cleaned broadband spectrum estimates $\tilde{C}_1(f)$ and $\tilde{C}_2(f)$ of said training and detection vectors; and using said cleaned broadband spectrum estimates $\tilde{C}_1(f)$ and $\tilde{C}_2(f)$ as input to a power law detection process given by:

$$\sum_n \left(\frac{\tilde{C}_2(f_n)}{\tilde{C}_1(f_n)}\right)^\nu \begin{array}{c} \text{signal present} \\ > \\ \leq \\ \text{signal absent} \end{array} \lambda$$

wherein $\tilde{C}_1(f_n)$ is a broadband spectrum estimate of the training vector $x_T$ for the $n^{th}$ subband, $\tilde{C}_2(f_n)$ is a broadband spectrum estimate of the detection vector $x_D$ for the $n^{th}$ subband, and the power $\nu$ is a positive real number to provide an output indicating a number and location of subbands occupied by a detected signal.

9. The method of claim 8 wherein said cleaned broadband spectrum estimates $\tilde{C}_1(f)$ and $\tilde{C}_2(f)$ are generated by adaptively separating non-stationary tonal components from the stationary broadband component.

10. The method of claim 8 wherein said step of generating cleaned broadband spectrum estimates comprises:

estimating narrowband tonals in each frequency subband within a series of subbands; and removing said estimated narrowband tonals from an underlying broadband spectrum.

11. The method of claim 10 wherein said step of estimating narrowband tonals comprises:

partitioning said training vector $x_T$ into L contiguous smaller subblocks, said partitioned training vector given by $x_T=[x_{1,1}, x_{1,2}, \ldots, x_{1,L}]$;

partitioning said detection vector $x_D$ into L contiguous smaller subblocks, said partitioned detection vector defined by $x_D=[x_{1,1}, x_{1,2}, \ldots, x_{1,L}]$; and estimating said narrowband components by solving:

$$\min_{\alpha_{j,k,l}^f, \omega_{j,k,l}^f} \left\| V^H D(f) x_{j,k} - \sum_{l=1}^{M_k^f} \alpha_{j,k,l}^f V^H e(\omega_{j,k,l}^f) \right\|_F^2$$

for $j = 1, 2; k = 1, 2, \ldots, L; l = 1, 2, \ldots, M_k^f$ wherein the vector $x_{j,k}$ is the $k^{th}$ data subblock from the partitioned training and detection vectors, $M_k^f$ is the number of tonals in frequency subband $f$ for subblock k, and $\hat{\alpha}_{j,k,l}^f$ and $\hat{\omega}_{j,k,l}^f$ are estimates of the amplitude and frequency of the narrowband tonals.

12. The method of claim 11 wherein said cleaned broadband spectrum estimates $\tilde{C}_1(f)$ and $\tilde{C}_2(f)$ are estimated as $$\tilde{C}_j(f) = \frac{1}{L} \sum_{k=1}^{L} \frac{1}{K - M_k^f} \left\| V^H D(f) x_{j,k} - \sum_{l=1}^{M_k^f} \hat{\alpha}_{j,k,l}^f V^H e(\hat{\omega}_{j,k,l}^f) \right\|_F^2.$$

13. The method of claim 12 wherein said training and detection vectors are partitioned into subblocks in which the narrowband components are locally stationary within each subblock.

14. A method for detecting unknown broadband signals in a received data stream comprising the steps of:

generating a training vector $x_T$ corresponding to a noise only portion of said received data stream and a detection vector $x_D$ corresponding to noise plus signal portion of said received data stream;

partitioning said training vector $x_T$ into L contiguous smaller subblocks, said partitioned training vector given by $x_T=[x_{1,1}, x_{1,2}, \ldots, x_{1,L}]$;

partitioning said detection vector $x_D$ into L contiguous smaller subblocks, said partitioned detection vector defined by $x_D=[x_{1,1}, x_{1,2}, \ldots, x_{1,L}]$;

estimating narrowband components by solving:

$$\min_{\alpha^f_{j,k,l}, \omega^f_{j,k,l}} \left\| V^H D(f) x_{j,k} - \sum_{l=1}^{M^f_k} \alpha^f_{j,k,l} V^H e(\omega^f_{j,k,l}) \right\|^2_F$$

for $j = 1, 2; k = 1, 2, \ldots, L; l = 1, 2, \ldots, M^f_k$ wherein the vector $x_{j,k}$ is the $k^{th}$ data subblock from the partitioned training and detection vectors, $M^f_k$ is the number of tonals in frequency subband $f$ for subblock k, and $\hat{\alpha}^f_{j,k,l}$ and $\hat{\omega}^f_{j,k,l}$ are estimates of the amplitude and frequency of the narrowband tonals;

removing said estimated narrowband tonals from an underlying broadband spectrum to generate cleaned broadband spectrum estimates $\tilde{C}_1(f)$ and $\tilde{C}_2(f)$ of said training and detection vectors, said cleaned broadband spectrum estimates being given by:

$$\hat{C}_j(f) = \frac{1}{L} \sum_{k=1}^{L} \frac{1}{K - M^f_k} \left\| V^H D(f) x_{j,k} - \sum_{l=1}^{M^f_k} \hat{\alpha}^f_{j,k,l} V^H e(\hat{\omega}^f_{j,k,l}) \right\|^2_F ; \text{ and}$$

using said cleaned broadband spectrum estimates $\tilde{C}_1(f)$ and $\tilde{C}_2(f)$ as input to a power law detection process given by:

$$\sum_n \left( \frac{\tilde{C}_2(f_n)}{\tilde{C}_1(f_n)} \right)^v \overset{\text{signal present}}{\underset{\text{signal absent}}{\gtrless}} \lambda$$

wherein $\tilde{C}_1(f_n)$ is a broadband spectrum estimate of the training vector $x_T$ for the $n^{th}$ subband, $\tilde{C}_2(f_n)$ is a broadband spectrum estimate of the detection vector $x_D$ for the $n^{th}$ subband, and the power $v$ is a positive real number to provide an output indicating a number and location of subbands occupied by a detected signal.

* * * * *